J. F. STRANAHAN.
RESILIENT TIRE.
APPLICATION FILED AUG. 8, 1921.
1,431,055.
Patented Oct. 3, 1922.
2 SHEETS—SHEET 2.
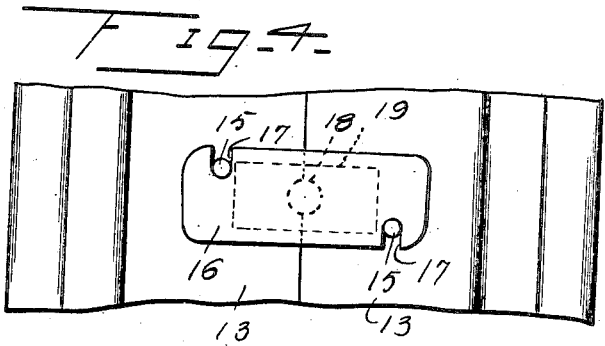
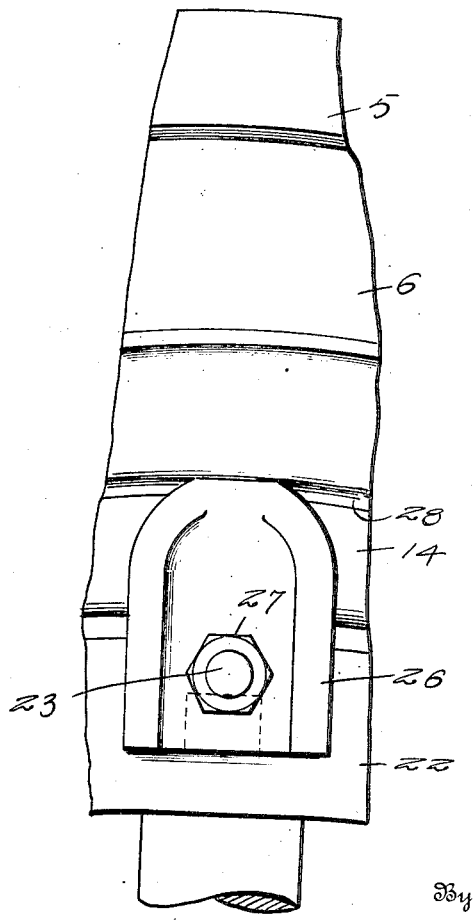
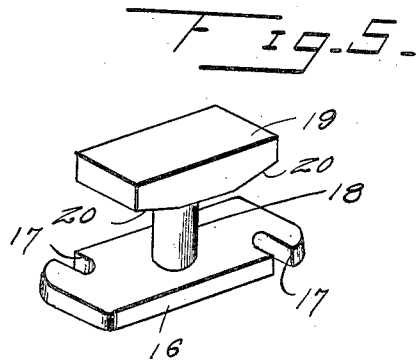
Inventor
J. F. Stranahan
By
Attorney Patented Oct. 3, 1922.

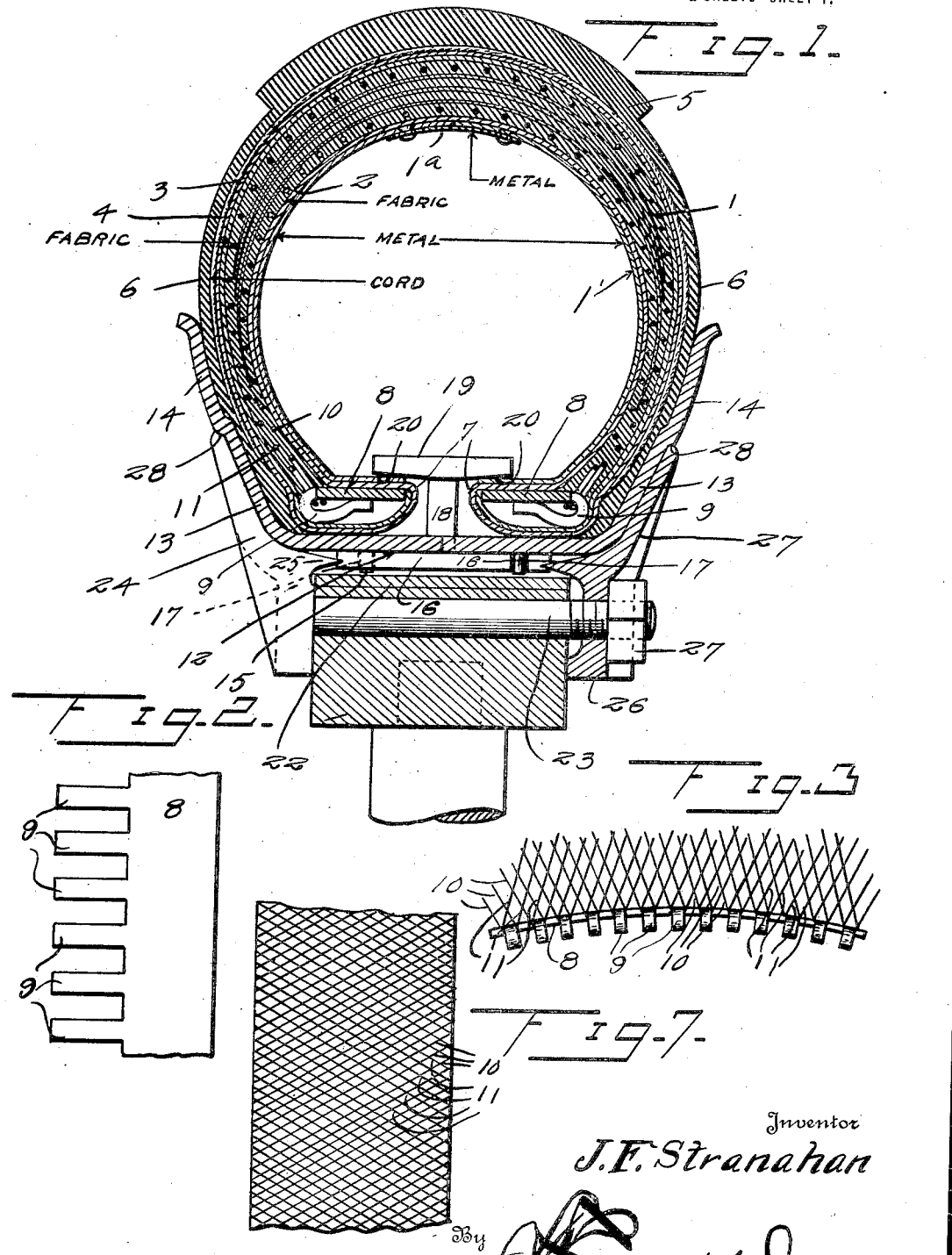

1,431,055

UNITED STATES PATENT OFFICE.

JAMES F. STRANAHAN, OF PITTSBURG, CALIFORNIA, ASSIGNOR OF ONE-HALF TO JOHN F. MARA, OF PITTSBURG, CALIFORNIA.

RESILIENT TIRE.

Application filed August 8, 1921. Serial No. 490,604.

*To all whom it may concern:*

Be it known that I, JAMES F. STRANAHAN, a citizen of the United States, residing at Pittsburg, in the county of Contra Costa and State of California, have invented certain new and useful Improvements in Resilient Tires; and I do hereby declare the following to be a full, clear, and exact description of the invention, such as will enable others skilled in the art to which it appertains to make and use the same.

This invention relates to new and useful improvements in resilient tires of the character set forth in my application filed December 7th, 1920, and serially numbered 428,996 and has for its primary object the provision of an improved means for anchoring the wire reinforcement in the tire and also the arrangement of the wires of said reinforcement to provide the tire with increased strength with still the desired resiliency.

Another object of this invention is the provision of means for securing together the sections of the rim and also forcing the beads of the tire against the flanges of the rim.

A further object of this invention is the extending of the flanges of the rim so that a large proportion of the walls of the tire will be supported and be prevented from breaking when under excessive strain.

A further object of this invention is the provision of a tire of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which :—

Figure 1 is a transverse sectional view, illustrating a tire and its rim and constructed in accordance with my invention, Figure 2 is a detail view, illustrating one of the anchoring means, Figure 3 is a fragmentary view illustrating the means of extending wires of the reinforcements, Figure 4 is a fragmentary plan view illustrating the means of connecting the sections of the rim, Figure 5 is a perspective view, illustrating the sectional rim fastener and tire expander.

Figure 8 is a fragmentary side elevation, illustrating the securing of the rim with the tire thereon to the felly of a wheel.

Figure 7 is a fragmentary plan view, illustrating the direction in which the reinforcements extend.

Referring in detail to the drawings the numeral 1 indicates a body of a tire and constructed of rubber and mounted upon a metallic sectional frame 1' and the latter is preferably constructed from a high grade of steel and includes side portions having abutting engagement at the crest of the tire and connected together by plate 1ª. The plate 1ª extends circumferentially of the tire and is riveted or otherwise secured to the side portions of the frame 1'. A layer of fabric 2 is positioned between the frame 1' and the body 1 and a layer of fabric 3 surrounds the outer face of the body 1. Cords 4 may be positioned on the layer of fabric 3 to reinforce the body. A tread 5 constructed of rubber is positioned on the crest of the body and is extended to form rubber side walls 6. The body 1 has beads 7 formed on its edges by the layers of fabric extended about plates 8.

Anchoring plates 8 are embedded within the beads 7 and have formed upon their outer edges relatively spaced hooks 9 that have their free ends disposed under and against said anchoring plates. The body 1 has embedded therein a plurality of metallic reinforcements, each constructed of diagonally extending strands of wire. To give a clear understanding of the metallic reinforcements, I have elected to employ inner and outer reinforcements 10 and 11, however, any number of reinforcements may be employed depending entirely on the size of the tire and the weight the tire is required to support or withstand. Each metallic reinforcement is preferably constructed from a strand of piano wire which is laced from one hook to another hook of the anchoring plates 8 and is disposed at an angle of approximately 62½ degrees. The strand of wire of one of the reinforcements is adapted to extend oppositely to the strand of wire of the other reinforcement, as clearly shown in the drawings so as to provide the body with considerable strength and durability. The wires after being laced in engagement with the hooks, the latter are bent into engagement with the under faces of the plates 8. The body 1 is built up from layers of fabric and rubber with the wires engaged by the rubber so that during the vulcanizing of the body the wires become embedded in the rubber of said body.

A rim 12 is provided for the tire and consists of a pair of sections 13 which have formed upon their outer edges tire engaging flanges 14 of considerable height for the purpose of engaging and supporting a large proportion of the side walls of the tire. The sections 13 have pairs of diagonally arranged lugs 15 to be engaged by locking plates 16 which are provided with notches 17 to receive said lugs, consequently preventing separation of the sections of the rim 12. The locking plates 16 are formed integrally with stems or shanks 18 which are adapted to extend through openings in the rim 12 and which openings are formed by oppositely arranged recesses in the opposing or adjacent edges of the sections 13 of said rim. The stems or shanks 18 extend between the beads 7 of the tire and have formed thereon heads 19 provided with beveled or inclined faces 20. When the plates 16 are in rim locking position, the heads 19 are so disposed as to force the beads and the walls of the tire against the tire plates 14 of the rim 12 by the beveled faces 20 engaging the beads 7. To remove the tire from the rim, the plates 16 are disengaged from the lugs 15 which turns the heads 19 to extend parallel with the beads 7 whereby the sections of the rim may be separated and the beads of the tire removed from said rim and consequently the removal of the tire in entirety from the rim is thus obtained.

The rim 12 is mounted or positioned upon a felly 22 of a wheel and is retained thereon by fastening means which consists of bolts 23 extending through the felly and having screw threaded ends and integral heads 24 which are adapted to engage one of the tire flanges of the rim 12. The heads 24 have tapered projections 25 formed thereon which extend between the periphery of the felly and the rim. Removable cleats 26 are mounted on the screw threaded ends of the bolts and retained thereon by nuts 27. The cleats engage the other tire flange of the rim 12 and are of similar shape to the heads 24. Extensions 27 are formed on the cleats 26 and extend between the periphery of the felly and the rim. The tire engaging flanges 14 are provided with annular offsets 28 adapted to form seats for the ends of the heads 24 and the cleats 26 to engage.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A tire comprising a body, a tread for said body, beads on said body, plates embedded in the beads, hooks formed on the outer edges of said plates, strands of wire embedded in the body and laced from one hook to another of said plates, said hooks after receiving the wires adapted to be bent against the plates.

2. A tire including a body having beads, plates embedded in said beads, bendable elements carried by said plates, strands of wire within the body and laced from one element to the other, said elements adapted to be bent against said plates to prevent the strands of wire from becoming detached therefrom.

3. A tire including a body having beads, plates embedded in said beads, relatively spaced bendable elements formed on the outer edges of the plates, and strands of wire within the body and laced from one element to the other, said elements adapted to be bent against said plates to prevent the strands of wire from becoming detached therefrom.

4. A tire including a body having beads, plates embedded in said beads, bendable elements formed on the outer edges of said plates, and strands of wire within the body and laced from one element to the other, said elements adapted to be bent inwardly and against the inner faces of the plates to prevent the strands of wire from becoming detached therefrom.

In testimony whereof I affix my signature in presence of two witnesses.

JAMES F. STRANAHAN.

Witnesses:
 JAS. FITZGERALD,
 N. SCOCCHI.